Sept. 11, 1951     C. C. S. LE CLAIR     2,567,774
VEHICLE WHEEL LUBRICATING APPARATUS Filed Jan. 30, 1946     3 Sheets-Sheet 2

Inventor
Camille Clare
Sprankling Le Clair

Williams, per Bradbury & Hahle
Attorneys

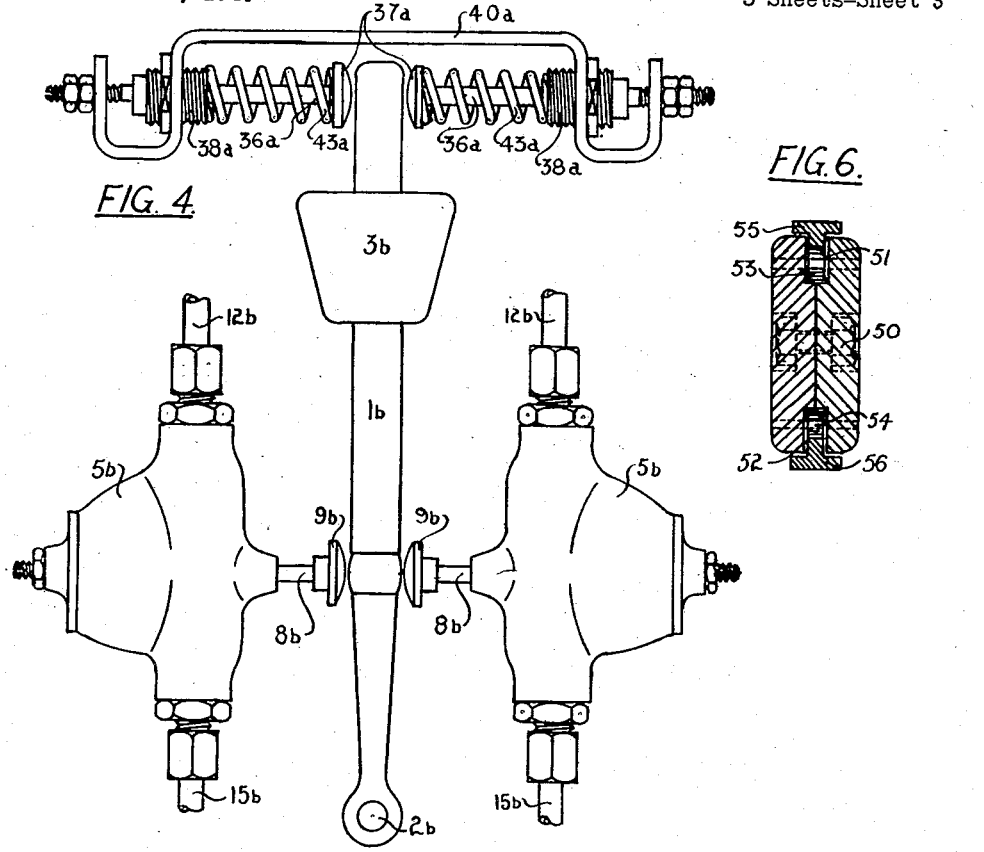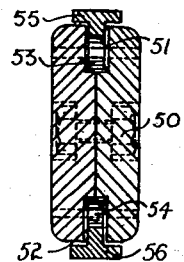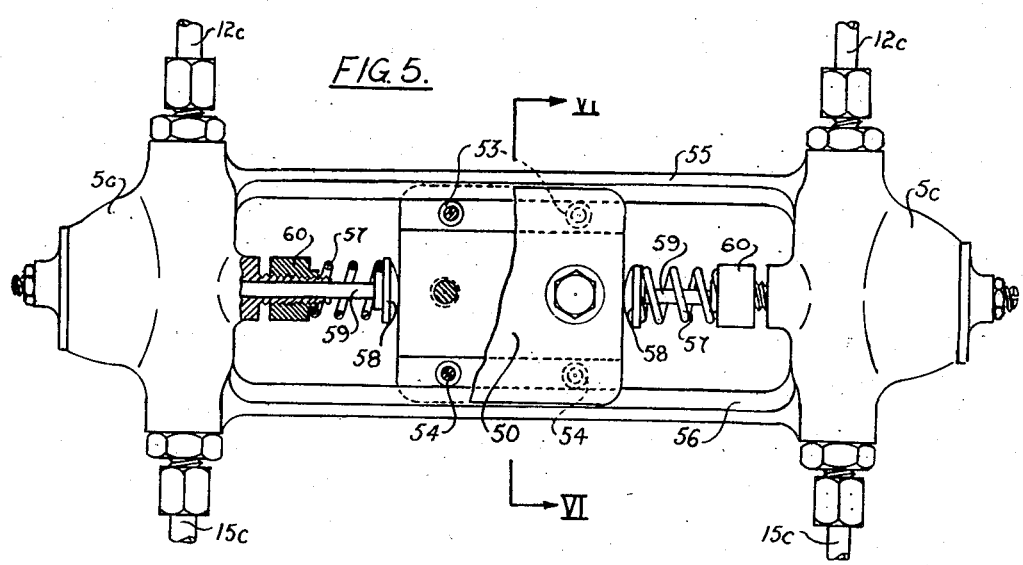

UNITED STATES PATENT OFFICE 2,567,774

VEHICLE WHEEL LUBRICATING APPARATUS

Camille Clare Sprankling Le Clair, Acton, London, England, assignor to Tecalemit Limited, Brentford, England, a corporation of Great Britain Application January 30, 1946, Serial No. 644,251
In Great Britain March 20, 1945

11 Claims. (Cl. 184—3)

This invention relates to the distribution of lubricant to the wheels of vehicles which run on railway or like rails.

As is well known, although the relation between a wheel and the rail it runs on is what is known as "rolling contact" and theoretically it does not require any lubrication, yet in practice it is found that a very slight application of lubricant does contribute to smoother and more silent running. This effect is much more marked on curves when, due to the centrifugal force produced, considerable side pressure and a certain amount of actual rubbing takes place between the flanges of the outer wheels and the outer rail.

The object of the present invention therefore is to provide an automatically-acting means whereby lubricant may be applied, usually in exceptionally small quantities to the flanges and/or tyres of wheels of vehicles which run on railway or like rails when they are running around curves, the arrangement being such that only the outer wheels which are bearing hard on the outer rail are lubricated, the inner wheels, whose flanges are held away from their rail, receiving no lubrication.

According to the present invention, the automatically-acting means comprises a mass which is mounted on the vehicle for movement transversely of the latter and which, when the vehicle is rounding a curve, acts automatically under the influence of centrifugal force to allow oil from a source of oil under pressure (which includes gravity) to be supplied to the flanges and/or tyres of those wheels which are running on the outside of the curve, the mass normally remaining inactive when the vehicle is running along a straight stretch of track.

The mass may be arranged between, and adapted to control, the opening of one or the other of two normally-closed valves, each of which is adapted to control the flow of oil fed to the valve from a source of oil under pressure to a position close to the flange and (or) the tyre of one at least of the wheels of the vehicle running on the outer rail of the curve, whence it can be applied to the flange and (or) the tyre by direct ejection or, for example, by wick.

When compressed air is available on the vehicle, or on the train of which the latter forms a part, it is preferred to use this as a means of atomising the oil and thus supplying oil spray or mist containing a small proportion only of oil which will be blown forcibly against the flange and/or tyre of the wheel. The mass may then be arranged between, and adapted to control the opening of, one or the other of two normally-closed valves, each of which is adapted to control the flow of a mixture of compressed air and oil to a position on the tyre and (or) flange of one at least of the wheels of the vehicle running on the outer rail of the curve.

In one such construction each of the valves is connected to a source of supply of compressed air, the outlet of each valve being connected to a source of supply of oil and to an atomiser which is also connected to the source of supply of oil, the outlet from each atomiser being connected to a pipe leading to a position close to the tyre and (or) the flange of at least one of the wheels of the vehicle on one side of the latter, the arrangement being such that each atomiser is adapted to supply oil spray or mist which will be blown forcibly against the tyre (or tyres) and (or) the flange (or flanges) of the wheel or wheels running on the outer rail of the curve.

The mass may be mounted as a pendulum and arranged for pivotal movement between the valves and adapted, under the influence of centrifugal force, to swing outwards towards, and to open, that valve which controls the supply of lubricant to the wheel or wheels runnnig on the outer rail of the curve.

The pendulum may be arranged in normal manner with the mass suspended below the supporting fulcrum or it may be reversed so that the mass is above the fulcrum.

As an alternative to the pendulum, the mass may be arranged in guides and adapted to slide transversely of the vehicle under the influence of centrifugal force when the vehicle is running round a curve.

Further constructional features of the invention will be described hereinafter.

Constructional forms of the invention are hereinafter described, by way of example, with reference to the accompanying drawings, whereon:

Fig. 4 is a view of another modified construction comprising a valve-operating pendulum which is fulcrumed at a position below the pendulum mass or weight;

Fig. 5 is an elevation of a further construction comprising a valve-operating weight which is slidably guided for movement transversely of the vehicle; and Fig. 6 is a section on the line A—A in Fig. 5.

Figure 1:
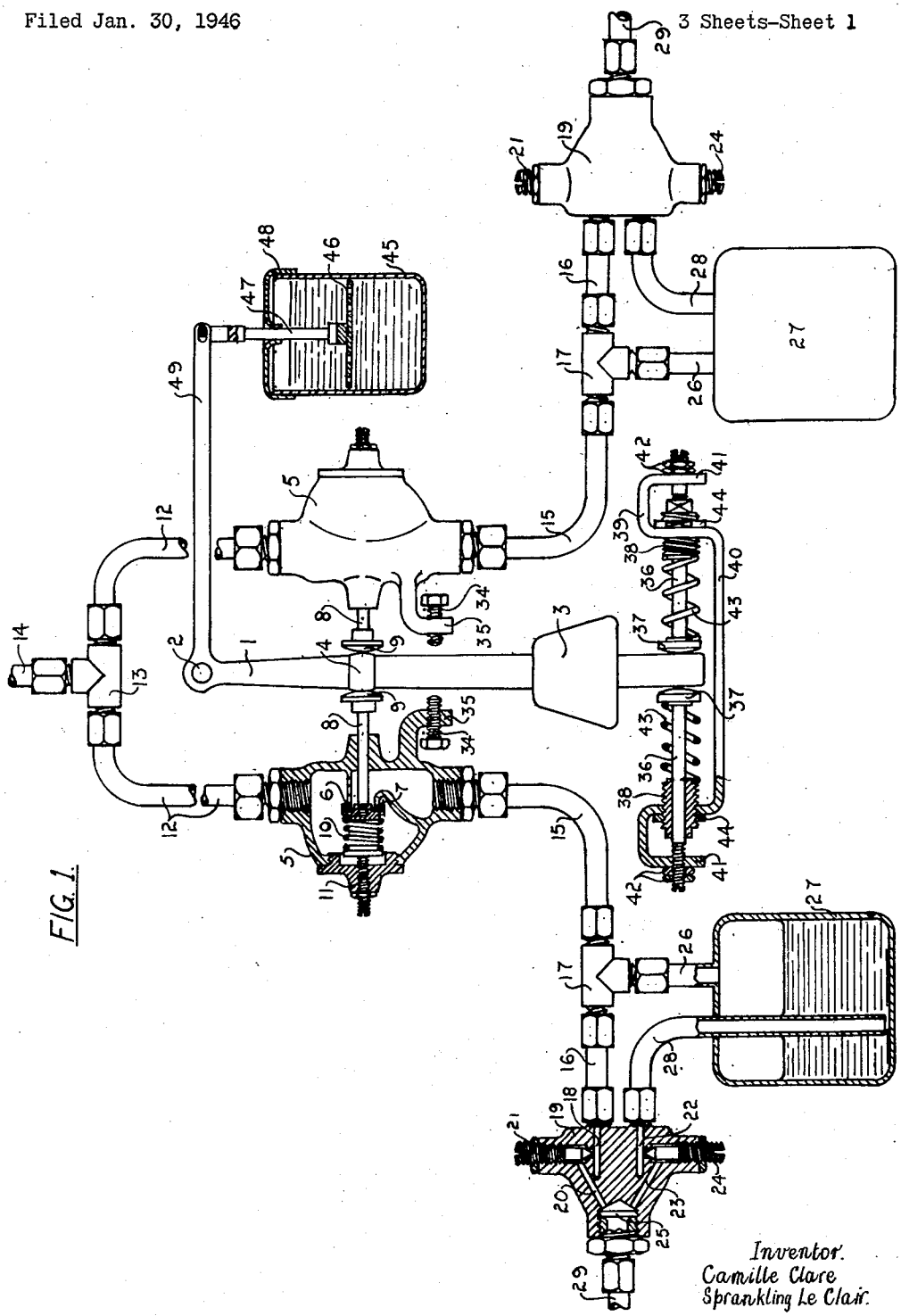
Fig. 1 is a diagrammatic view of one construction which comprises a pendulum adapted to open two normally-closed control valves in order to cause compressed air to be supplied to atomisers to which oil is also supplied, the oil spray or mist from the atomisers being blown forcibly against the tyres and (or) the flanges of those vehicle wheels which are running around the outside of a curve.

Referring first to Fig. 1:

In this pendulum form of construction the apparatus comprises a pendulum including a bar 1 which is pivotally suspended for swinging movement across the vehicle (such as a locomotive) at 2 near its upper end from a support (not shown) arranged within the vehicle and is provided at its bottom end with a heavy bob weight 3. The apparatus may be arranged as a complete assembly housed in a casing in which the pendulum will be mounted. A valve mechanism is arranged on each side of an abutment 4 provided on the pendulum bar. Each of these valve mechanisms comprises a valve casing 5 containing a valve seat 6 and a valve 7 having a valve stem 8 which projects out of the valve casing in the direction of the pendulum and which is provided with a head 9 arranged in relatively close proximity to one face of the abutment 4 provided on the pendulum bar. Each valve is normally held upon its seat by a spring 10 which acts to thrust the head 9 on the valve stem towards the said abutment and which reacts between the valve and an axially adjustable screw 11. The screws 11 are provided for adjusting the initial loads on the valve springs, so that the minimum conditions for opening the valves may be regulated. Thus, until a certain predetermined minimum of centrifugal force (and, therefore, a certain predetermined minimum of pressure between the tyre and rail) has been produced the valve will not open.

The inlet sides of the two valve casings 5 are connected by inlet pipes 12 to a T-piece 13 which is connected to a source of supply of compressed air (not shown) by a pipe 14. The outlet side of each of the valve casings is connected by an outlet pipe 15, 16 and a T-piece 17 to an air inlet passage 18 in an atomiser 19, which also has an air outlet passage 20. The flow of compressed air from the passage 18 into the passage 20 is controlled by an adjustable needle valve 21. The atomiser also includes an oil inlet passage 22 and an oil outlet passage 23, the flow of oil from the passage 22 into the passage 23 being controlled by an adjustable needle valve 24. The passages 20 and 23 communicate with an air and oil mixing or atomising chamber 25 in which the air and oil are mixed, the relative amounts of air and oil being controlled by the adjusting valves 21 and 24.

Each T-piece 17 is connected by a pipe 26 to the top of an oil tank 27 and the oil inlet passage 22 of each atomiser 19 is connected to an oil supply pipe 28, the bottom end of which is always immersed in the oil in the tank 27. Thus, when the valve 7 in either of the valve casings 5 is opened, compressed air flows into the air passages 18 and 20 and the mixing chamber 25 and also into the tank 27 above the surface of the oil in the latter, thus forcing oil upwardly through the pipe 28 and through the passages 22 and 23 into the mixing chamber 25.

Figure 2:
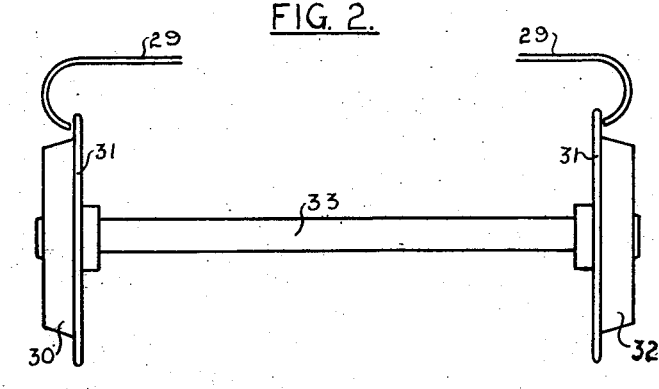
Fig. 2 is a diagrammatic, fragmentary view showing one arrangement of the ends of the oil or spray delivery pipes relatively to the wheels of the vehicle.

The mixing chambers 25 are connected to outlet pipes 29. Both these pipes are led downwardly, as shown in Fig. 2, the left hand pipe terminating in a convenient position adjacent to the left hand wheel 30 with its end directed towards the tyre and (or) the outer face of the wheel flange 31 and the right hand pipe terminating in a convenient position adjacent to the right hand wheel 32 with its end directed towards the tyre and (or) the outer face of the right hand wheel flange 31. The air-oil stream issuing from each of these pipes is directed upon either or both these parts. Although a single outlet pipe 29 is shown is being connected to each of the atomisers 19, it will be understood that there may be several such pipes each leading to a wheel or that the single pipe may be connected to several pipes each leading to a wheel.

In the preferred arrangement, each pipe 29 is led to a position level with the axle 33 and is directed horizontally against the wheel tyre and/or flange, where the latter is vertical. In this manner, the relationship between the end or mouth of the pipe and the wheel is not altered substantially as the wheel rises and falls due to the flexing of the vehicle springs.

When the vehicle is running over a straight stretch of the railway lines, the pendulum bar 1 hangs in its normal vertical position and the said abutment 4 thereon does not engage with the head 9 on the valve stem 8 of either of the valves. On the other hand, when the vehicle is rounding a curve, say to the right, centrifugal force causes the pendulum to swing over to the left and the abutment 4 on the pendulum engages the head 9 on the valve stem 8 of the valve 5 on the left and thus causes the valve 7 to be pressed off its seat. The air-oil mixture from the left hand atomiser 19 will then pass from the mixing chamber 25 into the pipe 29 connected thereto and will thus be sprayed against the flange and/or tyre of the or each left hand wheel, the flange of which will be bearing against the outer rail. The reverse movements take place when the vehicle is rounding a curve to the left, the air-oil mixture then being sprayed on to the flange and/or tyre of the or each wheel on the right. In this manner, in either case lubrication is provided only as and when required.

The advantage of using compressed air for atomisation is that it enables the quantity of oil delivered to be better controlled and it provides energy whereby the oil may be blown forcibly against the flanges and/or tyres.

Figure 3:
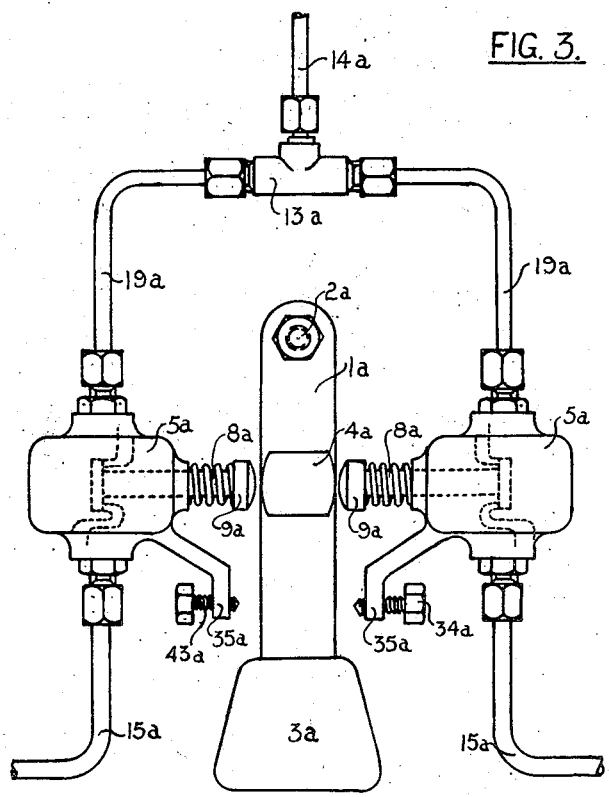
Fig. 3 is a diagrammatic view of a simpler construction in which the inlets of the control valves are connected to a source of oil and their outlets to pipes through which oil from the valves is led to the tyres and (or) the flanges of the vehicle wheels without the agency of compressed air.

In a simpler constructional form of the invention shown in Fig. 3, the atomisers 19 may be omitted and the inlet of the two valves 5a may be connected by inlet pipes 19a, a T-piece 13a and a pipe 14a to an oil supply source (not shown), which may, for example, comprise a pump or a tank under pressure or a gravity tank. In this construction, the outlets of the two valves are connected to outlet pipes 15a each of which, as in the construction described above, is led downwards to a convenient position adjacent to one of the left hand or right hand vehicle wheels with its end directed towards the tyre and (or) the outer face of the wheel flange. On the other hand, each pipe 15a may be connected to a number of pipes each leading to a position close to the tyre and (or) the flange of one of the wheels on one side of the vehicle. Each valve is constructed in the manner described above, and the heads 9a on the valve stems 8a are disposed on opposite sides of the abutment 4a on the pendulum bar 1a, which latter is pivoted at 2a at its upper end and is provided with a heavy weight 3a at its lower end.

Referring again to Fig. 1, adjustable stop means may be provided for regulating the maximum opening of the air-control valves 7, by limiting the maximum swing of the pendulum. These means may consist of screws 34 threaded through holes formed in brackets 35 projecting downwardly and inwardly from the valve casings 5, the ends of the screws being disposed on opposite sides of the pendulum bar 1 below the abutment 4.

Similar adjusting screws 34a are used in the construction shown in Fig. 3, these screws being threaded through holes in brackets 35a projecting downwardly and inwardly from the valve casings 5a.

Spring means may also be applied to the pendulum itself for a similar purpose, i. e., to control its movements and ensure that predetermined minimum conditions are produced before the valve opens.

Thus, referring to Fig. 1, two spindles 36 may be arranged on opposite sides of the pendulum bar 1, each spindle being provided with a head 37. Each spindle is slidable in an adjusting nut 38 which is screwed into a threaded hole formed in an upturned part 39 of a bracket 40. The outer end of each spindle is threaded and is slidable through a second hole also formed in a downturned part 41 of the bracket 40, locknuts 42 being screwed upon the projecting end. A coil spring 43 surrounds each spindle and reacts between the nut 38 and the spindle head 37, thereby forcing the latter towards the pendulum bar 1 below the weight 3. The initial load upon each spring 43 is regulated by adjusting the nut 38 and locking the latter in position by means of a locknut 44. The movement of each spindle towards the pendulum bar is limited by the said locknuts 42, the inner of which abuts against the part 41 under the action of the coil spring. The locknuts 42 are usually so positioned upon the spindle 36 that there is a small clearance between the spindle heads 37 and the pendulum bar.

Damping means of various forms may also be provided if found desirable to damp out any surging motion of the pendulum which may result from the swaying motion of the vehicle or train of vehicles.

One such damping means is shown, by way of example, in Fig. 1. It comprises a closed container 45 for viscous oil, in which a disc 46 is loosely fitted and immersed in the oil. The disc is attached by means of a rod 47 projecting through the cover 48 of the container to an arm 49 which is attached to, or is integral with, the upper, or fulcrum, end of the pendulum bar 1. As the pendulum bar swings, the disc 46 is raised or lowered in the oil which thus acts as a damper. If desired, the disc may be provided with holes in order to prevent the damping action being too severe.

Other damping means, may, for example, comprise a paddle or fin depending from the pendulum and immersed in a container of viscous oil in such a manner that when the pendulum swings oil is displaced by the movement of the paddle, or, alternatively, it may comprise a metallic disc or plate arranged between the poles of a permanent magnet in such a manner that when the pendulum swings eddy currents are induced in the disc and retardation thereby caused.

In the modified construction shown in Fig. 4, the pendulum bar 1b is mounted for transverse swinging movement at its lower end upon a fulcrum 2b, and the pendulum weight 3b is arranged above the fulcrum near the upper end of the bar. The pendulum is normally centralised in a vertical position by stop means similar in construction to those shown in Fig. 1, such means comprising spindles 36a slidably arranged on opposite sides of the pendulum bar in adjustable nuts 38a supported in a bracket 40a, the spindles being provided with heads 37a which are urged into contact with the pendulum bar above the weight 3a by coil springs 43a. This construction comprises air valves 5b constructed like the valves 5 shown in Fig. 1, the inlets to the valve casings being connected by pipes 12b to a source of supply of air and their outlets being connected via outlet pipes 15b to oil supplies and atomisers as described in connection with Fig. 1. An abutment 4b on the pendulum bar 1b is adapted to cooperate with the heads 9b on the valve spindles 8b.

The modification shown in Figs. 5 and 6 differs from the previously described constructions in that the pendulum is replaced by a sliding weight 50. For convenience in manufacture the weight is made in two halves which, when bolted together, provide upper and lower longitudinal grooves 51 and 52 in which upper and lower T-section guide rails 55 and 56 are arranged. To reduce friction spaced rollers 53 and 54 may be introduced, as shown, but these are not essential.

The upper rollers 53 if fitted run in contact with the lower face of the T-section guide rail 55 which engages in the groove 51. Similarly, the lower rollers 54 if fitted run upon the upper face of the lower T-section guide bar 56 which engages in the groove 52. The two guide rails are integral with or may be attached to the casings of air valves 5c which are similar in construction to the air valves 5 shown in Fig. 1, the inlets of both valves being connected by inlet pipes 12c to a source of air supply (not shown) and their outlets being connected to outlet pipes 15c which lead downwardly to the wheels as described in connection with Figs. 1, 2, 3 and 4.

The sliding weight 50 is normally held centralized between the valves 5c by the coil springs 57 which force the heads 58 of the valve spindles 59 into close proximity to the opposite end faces of the weight. Each coil spring reacts between the spindle head 58 and adjusting lock nuts 60 threaded upon a hollow boss 61 which projects inwardly from the valve casing and acts as a guide for the valve spindle.

The operation of the constructions shown in Figs. 3, 4 and 5 and 6 will be quite clear from the above description of the apparatus shown in Fig. 1.

It will be obvious that a single pendulum or sliding mass may be used to control more than one set of valves, each set including two control valves arranged on opposite sides of the pendulum or sliding mass.

Each valve may also be arranged to control the supply of oil to a single wheel or to a number of wheels arranged on the same side of the vehicle or train of vehicles.

The inlets of the valves shown in Figs. 4 and 5 may, of course, be connected to a source of oil supply and their outlets directly to positions in proximity to the wheels as described with reference to Fig. 3.

Further, the atomisers shown in Fig. 1 may be eliminated and the valves may be connected to a source of supply of atomised oil. The same remarks apply to the valves of the constructions of Figs. 4 and 5.

I claim:

1. Apparatus responsive to centrifugal force acting on a vehicle rounding a curve and for supplying lubricant to the flanged wheels of the vehicle which runs on rails, comprising a mass, means for mounting said mass on the vehicle for movement from an inoperative position transversely of the vehicle, a source of lubricant, a source of compressed air, said sources being mounted on said vehicle, two valve casings mounted on said vehicle, each of said valve casings having an air inlet and an air outlet, a normally closed valve in each of said casings between said inlet and said outlet, said mass being mounted between said valve casings for movement from its inoperative position into a position to open one or the other of said valves when said vehicle is rounding a curve at which time said mass moves transversely of the vehicle to one side or the other of its inoperative position under the influence of the centrifugal force, means connecting the inlet of each of said valve casings to said source of compressed air, means connecting the outlet of each of said valve casings to said source of lubricant, two atomizers, each atomizer having an outlet, means connecting each of said atomizers to the outlet of one of said valve casings, and means connected to the outlet from each said atomizers adapted to direct the mixture of compressed air and lubricant from said atomizer onto the flange of one at least of the vehicle wheels running on the outer rail of the curve when one of said valves is opened by the transverse movement of said mass to one side of its inoperative position.

2. Apparatus responsive to centrifugal force acting on a vehicle rounding a curve and for supplying lubricant to the flanged wheels of the vehicle which runs on rails, comprising a mass, means for mounting said mass on the vehicle for movement from an inoperative position transversely of the vehicle, at least one source of lubricant under pressure, a source of compressed air, said sources being mounted on said vehicle, two valve casings mounted on said vehicle, each of said valve casings having an air inlet and an air outlet, a normally closed valve in each of said casings between said inlet and said outlet, said mass being mounted between said valve casings for movement from its inoperative position into a position to open one of the other of said valves when said vehicle is rounding a curve at which time said mass moves transversely of the vehicle to one side or the other of its inoperative position under the influence of the centrifugal force, means connecting the inlet of each of said valve casings to said source of compressed air, means connecting the outlet of each of said valve casings to said source of lubricant under pressure, an atomizer having an inlet, means connecting said atomizer to the outlet of one of said valve casings, and means connected to the outlet from said atomizer adapted to direct the mixture of compressed air and lubricant from said atomizer onto the flange of one at least of the vehicle wheels running on the outer rail of the curve when one of said valves is opened by the transverse movement of said mass to one side of its inoperative position.

3. Apparatus responsive to centrifugal force acting on a vehicle rounding a curve and for supplying lubricant to the flanged wheels of the vehicle which runs on rails, comprising a mass, means for mounting said mass on the vehicle for movement from an inoperative position transversely of the vehicle, two sources of lubricant, a source of compressed air, said sources being mounted on said vehicle, two valve casings mounted on said vehicle, each of said valve casings having an air inlet and an air outlet, a normally closed valve in each of said casings between said inlet and said outlet, said mass being mounted between said valve casings for movement from its inoperative position into a position to open one or the other of said valves when said vehicle is rounding a curve at which time said mass moves transversely of the vehicle to one side or the other of its inoperative position under the influence of the centrifugal force, means connecting the inlet of each of said valve casings to said source of compressed air, means connecting the outlet of each of said valve casings to one of said sources of lubricant, two atomizers, each atomizer having an outlet, means connecting each of said atomizers to the outlet of one of said valve casings, means connecting each of said atomizers to one of said lubricant sources, and means connected to the outlet from each said atomizers adapted to direct the mixture of compressed air and lubricant from said atomizer onto the flange of one at least of the vehicle wheels running on the outer rail of the curve when one of said valves is opened by the transverse movement of said mass to one side of its inoperative position.

4. Apparatus as claimed in claim 1, wherein said mass consists of a pendulum, a weight carried thereby, said pendulum being pivotally mounted between said valve casings and adapted, under the influence of centrifugal force, to swing outwardly from its inoperative position toward and to open that valve which is on the side of the vehicle running on the outer rail of the curve.

5. Apparatus as claimed in claim 4, wherein the fulcrum of said pendulum is arranged above said weight.

6. Apparatus as claimed in claim 1, wherein said mass consists of a weight, and said mounting means comprises a guide for slidably guiding said weight transversely between said valve casings in such a manner that, under the influence of centrifugal force, it may slide outwardly toward, and open, that valve which is on the side of the vehicle running on the outer rail of the curve.

7. Apparatus as claimed in claim 1, including adjustable abutment means comprising spring urged stops arranged on opposite sides of said mass to limit the movement of said mass in either valve opening direction.

8. Apparatus as claimed in claim 1, wherein each of said atomizers has an inlet passage for compressed air connected to the outlet from one of the said valve casings, an inlet passage for lubricant connected to the said source of lubricant, and a mixing chamber connected to said outlet from said atomizer and into which said inlet passages lead.

9. Apparatus as claimed in claim 1, wherein said valves are closed by spring means, and including means for adjusting the initial loads on said springs so that the minimum conditions for opening said valves may be regulated.

10. Apparatus as claimed in claim 1, wherein each of said atomizers comprises means for controlling the relative amounts of air and lubricant ejected from said atomizer.

11. Apparatus as claimed in claim 1, wherein said mass consists of a generally vertically extending member, a weight mounted thereon, said member being pivotally mounted at a position below the location of said weight thereon and between said valve casings and adapted, under the influence of centrifugal force, to swing outwardly from its inoperative position toward and to open that valve which is on the side of the vehicle running on the outer rail of the curve.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 981,597 | Noble | Jan. 10, 1911 |
| 1,013,197 | McQuade | Jan. 2, 1912 |
| 1,060,174 | Feeny | Apr. 29, 1913 |
| 1,136,003 | Gray | Apr. 20, 1915 |
| 1,343,973 | Hoofer | June 22, 1920 |
| 1,687,185 | Tipton | Oct. 9, 1928 |
| 2,184,969 | Allen | Dec. 26, 1939 |
| 2,417,526 | Steins | Mar. 18, 1947 |

FOREIGN PATENTS

| Number | Country | Date |
| --- | --- | --- |
| 121,601 | Great Britain | Jan. 30, 1919 |
| 720,994 | France | Dec. 12, 1931 |